United States Patent
Beason et al.

(10) Patent No.: US 10,724,682 B2
(45) Date of Patent: Jul. 28, 2020

(54) DELIVERING AND METERING GREASE TO PROCESS VALVES

(71) Applicant: DOWNING WELLHEAD EQUIPMENT, LLC, Oklahoma City, OK (US)

(72) Inventors: Ronnie B. Beason, Lexington, OK (US); Nicholas J. Cannon, Washington, OK (US)

(73) Assignee: DOWNING WELLHEAD EQUIPMENT, LLC, Oklahoma City, OK (US)

(*) Notice: Subject to any disclaimer, the term of this patent is extended or adjusted under 35 U.S.C. 154(b) by 0 days.

(21) Appl. No.: 16/248,648

(22) Filed: Jan. 15, 2019

(65) Prior Publication Data

US 2019/0219225 A1    Jul. 18, 2019

Related U.S. Application Data

(60) Provisional application No. 62/617,443, filed on Jan. 15, 2018.

(51) Int. Cl.
  *F16N 29/02*      (2006.01)
  *F16N 13/16*      (2006.01)
  *F16N 13/20*      (2006.01)

(52) U.S. Cl.
  CPC .......... *F16N 29/02* (2013.01); *F16N 13/16* (2013.01); *F16N 13/20* (2013.01); *F16N 2250/16* (2013.01); *F16N 2270/20* (2013.01)

(58) Field of Classification Search
  CPC .......... F16N 29/02; F16N 13/16; F16N 13/20; F16N 2250/16; F16N 2270/20
  See application file for complete search history.

(56) References Cited

U.S. PATENT DOCUMENTS

| | | | | |
|---|---|---|---|---|
| 1,981,507 | A * | 11/1934 | Cleo Harris | F01B 17/00 222/109 |
| 4,520,902 | A * | 6/1985 | Snow | F16N 25/02 137/596.12 |

(Continued)

FOREIGN PATENT DOCUMENTS

WO    WO 2016/015732      2/2016

OTHER PUBLICATIONS

International Search Report and Written Opinion issued in International Application No. PCT/US19/13701, dated Apr. 3, 2019, 9 pages.

(Continued)

*Primary Examiner* — Michael R Mansen
*Assistant Examiner* — Mark K Buse
(74) *Attorney, Agent, or Firm* — Haynes and Boone, LLP

(57) ABSTRACT

A system generally including a delivery module and metering modules adapted to deliver grease to process valves. The metering modules each include a grease metering device including either: a grease cylinder, a piston extending within the grease cylinder, and a first actuator; or a casing, a rotor extending within the casing, and a second actuator. The delivery module includes a grease container and a fluid transport device adapted to deliver grease from the grease container to the grease metering modules. A control unit is adapted to control: the first actuator(s) to stroke the piston(s) within the grease cylinder(s) so that respective amounts of the delivered grease are metered to the process valves; and/or the second actuator(s) to rotate the rotor(s) within the casing(s) so that the respective amounts of the delivered grease are metered to the process valves.

39 Claims, 4 Drawing Sheets

(56) References Cited

U.S. PATENT DOCUMENTS

| | | | | |
|---|---|---|---|---|
| 5,285,871 | A * | 2/1994 | Sievenpiper | F16N 11/10 184/29 |
| 6,053,285 | A * | 4/2000 | Reeves | F16N 29/00 184/6.23 |
| 7,367,428 | B2 * | 5/2008 | Schmidt | F16N 7/385 184/6.1 |
| 9,222,618 | B2 * | 12/2015 | Donovan | F16N 7/14 |
| 2008/0142304 | A1 * | 6/2008 | Schutz | F16N 7/38 184/7.4 |
| 2010/0326736 | A1 * | 12/2010 | Hall | E21B 10/24 175/228 |
| 2011/0253481 | A1 | 10/2011 | Lin | |
| 2012/0132303 | A1 * | 5/2012 | Conley | F16N 7/14 137/565.17 |
| 2012/0247876 | A1 * | 10/2012 | Kreutzkamper | F16N 7/385 184/26 |
| 2013/0034458 | A1 | 2/2013 | Ozeki | |
| 2013/0277147 | A1 * | 10/2013 | Conley | F16N 7/385 184/6 |
| 2013/0277148 | A1 * | 10/2013 | Beck | F16N 29/02 184/6.4 |
| 2015/0114991 | A1 | 4/2015 | Alekseyev et al. | |
| 2015/0176762 | A1 * | 6/2015 | Conley | F16N 29/02 417/43 |
| 2016/0186929 | A1 | 6/2016 | Klaphake et al. | |
| 2016/0208983 | A1 * | 7/2016 | Moilanen | F16N 13/06 |
| 2017/0038003 | A1 * | 2/2017 | Conley | F16N 7/385 |
| 2017/0276293 | A1 | 9/2017 | McKim | |
| 2019/0024547 | A1 * | 1/2019 | Gustafson | F04B 49/02 |

OTHER PUBLICATIONS

International Search Report and Written Opinion issued in International Application No. PCT/us19/13701, dated Apr. 3, 2019, 10 pages.

* cited by examiner

DELIVERING AND METERING GREASE TO PROCESS VALVES

CROSS-REFERENCE TO RELATED APPLICATION

This application claims the benefit of the filing date of, and priority to, U.S. Application No. 62/617,443, filed Jan. 15, 2018, the entire disclosure of which is hereby incorporated herein by reference.

TECHNICAL FIELD

The present disclosure relates generally to grease injection and, more particularly, to an apparatus, system, and method for delivering and metering grease to process valves used in, for example, oil and gas operations.

BACKGROUND

Certain valves used in, for example, oil and gas operations encounter debris and contaminants, which can severely impair the performance of these valves. To address this issue, specific amounts of grease must be injected into the valves to flush the debris and contaminants. Currently, to inject appropriate amounts of grease into such valves, an operator manually connects a pump to the valves one at a time and pumps grease to each valve for a predetermined amount of time. In some cases, since this process is inherently inexact, operators will pump for extra time to ensure that an adequate amount of grease is pumped into each valve. In other cases, a less than adequate amount of grease is pumped into each valve, increasing the risk of malfunction and maintenance needs. Accordingly, an apparatus, system, or method capable of injecting grease into numerous valves and monitoring the amount of grease injected into each valve would be desirable. Therefore, what is needed is an apparatus, system, or method that addresses one or more of the foregoing issues and/or one or more other issues.

DETAILED DESCRIPTION

Figure 1:
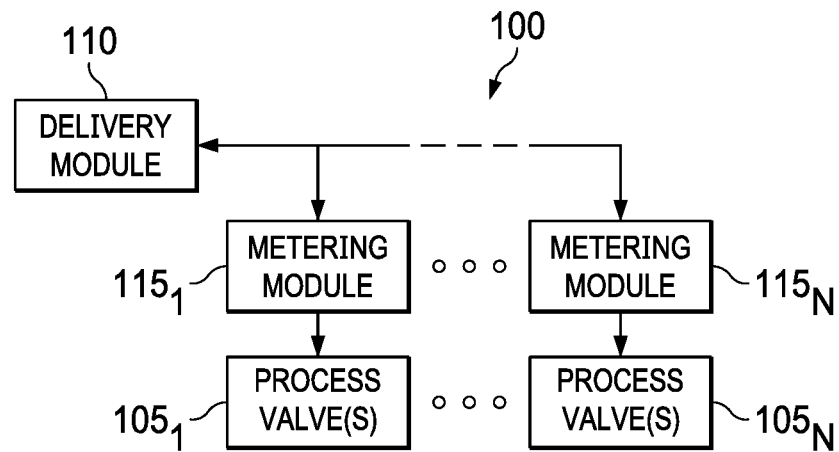
FIG. 1 is a diagrammatic illustration of a system for lubricating process valves, the system including a delivery module and metering modules, according to one or more embodiments of the present disclosure.

Referring to FIG. 1, in an embodiment, a system for delivering and metering grease to process valves $105_{1-N}$ used in oil and gas operations is diagrammatically illustrated and generally referred to by the reference numeral 100. For example, the process valves $105_{1-N}$ may be part of an oil and gas wellbore fracturing system. In some embodiments, the process valves $105_{1-N}$ are gate valves. The system 100 includes a delivery module 110 and metering modules $115_{1-N}$. The metering modules $115_{1-N}$ are each operably associated with, and adapted to be in communication with, the delivery module 110. Likewise, the process valves $105_{1-N}$ are operably associated with, and adapted to be in communication with, the metering modules $115_{1-N}$, respectively. In operation, to grease the process valves $105_{1-N}$, the metering modules $115_{1-N}$ are adapted to force grease from the delivery module 110 into the respective process valves $105_{1-N}$.

Figure 2:
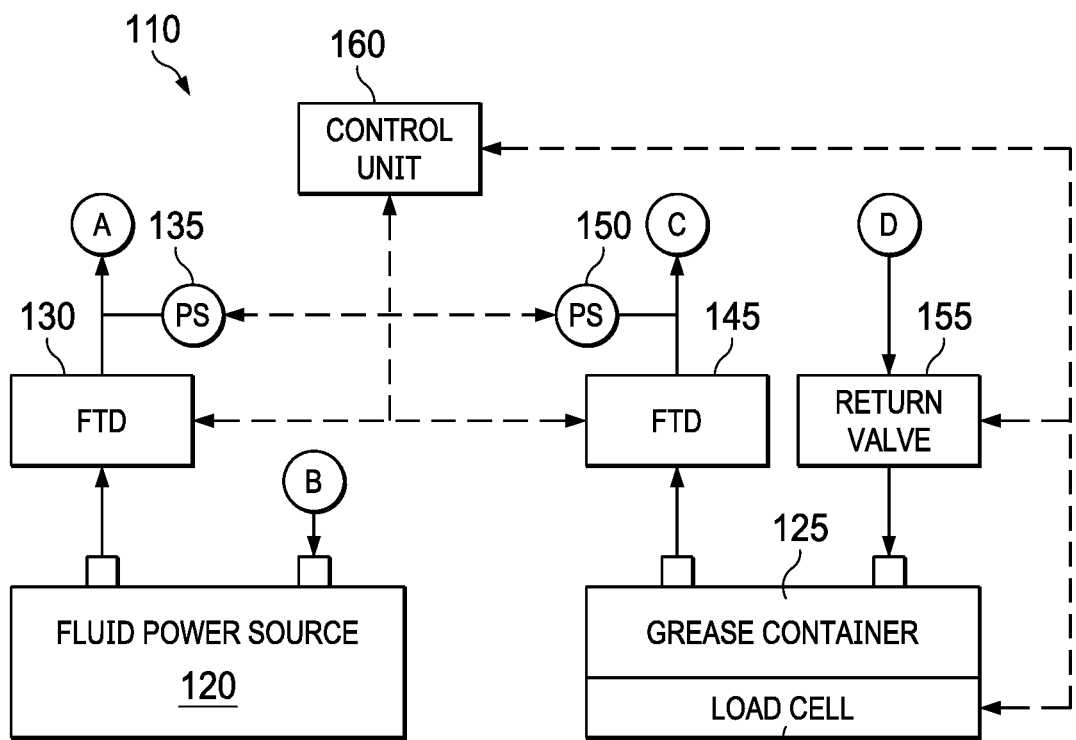
FIG. 2 is a diagrammatic illustration of the delivery module of FIG. 1, according to one or more embodiments of the present disclosure.

Referring to FIG. 2 with continuing reference to FIG. 1, in an embodiment, the delivery module 110 includes a fluid power source 120 and a grease container 125. The fluid power source 120 stores a power fluid for forcing grease from the grease container 125 into the process valves $105_{1-N}$, as will be described in further detail below. A fluid transport device 130 is operably associated with the fluid power source 120. The fluid transport device 130 can be a pump or a compressor, depending on the nature of the power fluid being used. In addition, or instead, the fluid transport device 130 may be or include a hydraulic power unit ("HPU") accumulator. In any case, the fluid transport device 130 is adapted to transport the power fluid from the fluid power source 120 to the metering modules $115_{1-N}$. A pressure sensor 135 is operably associated with the fluid transport device 130. The pressure sensor 135 is adapted to detect the pressure of the power fluid discharged from the fluid transport device 130. In addition to providing the power fluid transported to the metering modules $115_{1-N}$, the fluid power source 120 is also adapted to receive recycled power fluid from the metering modules $115_{1-N}$.

The grease container 125 stores grease. A grease measuring device 140 such as, for example, a load cell (e.g., a scale) is operably associated with the grease container 125. The grease measuring device 140 may be adapted to measure a mass of the grease container 125 to keep track of the amount of grease that has been used and how much is remaining. However, although described herein as a load cell, the grease measuring device 140 may be any suitable device capable of monitoring the amount of grease in the grease container 125 such as, for example, a ranging device, a linear position transducer, an optical/laser device, or the like that measures a level of the grease within the grease container 125. A fluid transport device 145 is operably associated with the grease container 125. The fluid transport device 145 can be a pump or a compressor, depending on the nature of the power fluid being used. In addition, or instead, the fluid transport device 145 may be or include a hydraulic power unit ("HPU") accumulator. In any case, the fluid transport device 145 is adapted to transport grease from the grease container 125 to the metering modules $115_{1-N}$. A pressure sensor 150 is operably associated with the fluid transport device 145. The pressure sensor 150 is adapted to detect the pressure of the grease discharged from the fluid transport device 145. In addition to providing the grease transported to the metering modules $115_{1-N}$, the grease container 125 is also adapted to receive recycled grease from the metering modules $115_{1-N}$. To this end, a return valve 155 is operably associated with the grease container 125 and adapted to selectively permit communication of the recycled grease from the metering modules $115_{1-N}$ to the grease container 125.

In some embodiments, as in FIG. 2, the system 100 also includes a control unit 160. The control unit 160 is adapted to send control signals to the fluid transport devices 130 and 145 and the return valve 155. In addition, the control unit 160 may receive operating speed data from the fluid transport devices 130 and 145 and/or valve position data from the return valve 155. The control unit 160 is also adapted to receive data/readings from the pressure sensors 135 and 150 (e.g., pressure data) and the grease measuring device 140 (e.g., grease measurement data).

Figure 3:
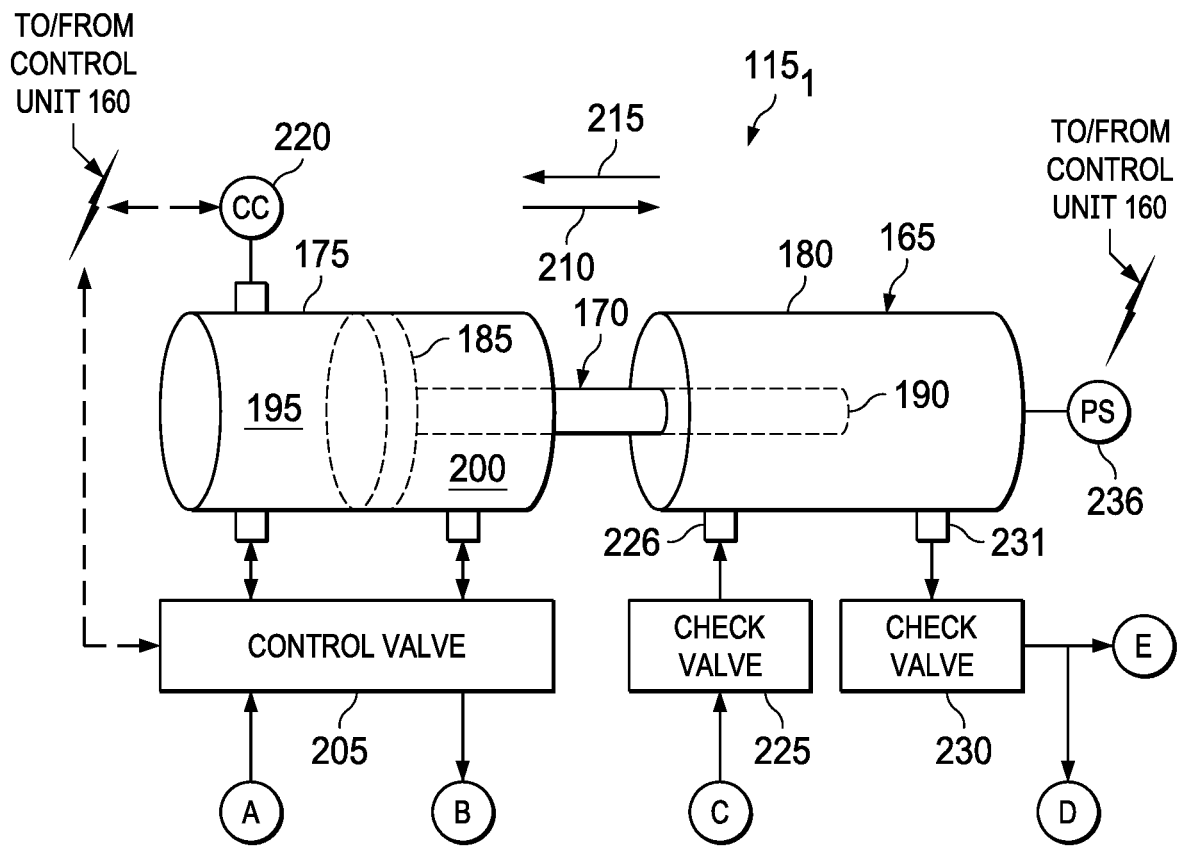
FIG. 3 is a diagrammatic illustration of a first embodiment of one of the metering modules of FIG. 1, according to one or more embodiments of the present disclosure.

In some embodiments, the metering modules $115_{1-N}$ are substantially identical to each other and, therefore, in connection with FIG. 3, only the metering module $115_1$ will be described in detail below; however, the description below also applies to the metering modules $115_{2-N}$. Referring to FIG. 3 with continuing reference to FIGS. 1 and 2, in an embodiment, to meter the amount of grease sent to a particular one of the process valves $105_1$, the metering module $115_1$ includes a grease metering device 165 such as, for example, a grease pump. In some embodiments, as in FIG. 3, the grease metering device 165 includes a piston 170, a power cylinder 175, and a grease cylinder 180.

The piston 170 includes a head portion 185 and a rod portion 190. The head portion 185 is slidably disposed in the power cylinder 175 and divides the power cylinder 175 into chambers 195 and 200. The rod portion 190 extends from the head portion 185 into the grease cylinder 180 so that, as the head portion 185 travels back and forth in the power cylinder 175, the rod portion 190 extends at least partially into, and retracts at least partially out of, the grease cylinder 180. The piston 170 may be displaced within the power cylinder 175 via hydraulic or pneumatic power; thus, in some embodiments, the power fluid stored by the fluid power source 120 is hydraulic or pneumatic. In addition, or instead, electric or gas power may be utilized to displace the piston 170.

In some embodiments, as in FIG. 3, a control valve 205 is operably associated with the power cylinder 175. The control valve 205 is adapted to receive the power fluid from the fluid transport device 130. To stroke the piston 170 in a direction 210, the control valve 205 is adapted to communicate power fluid from the fluid transport device 130 to the chamber 195 and, at the same time, to communicate power fluid from the chamber 200 back to the fluid power source 120. Similarly, to stroke the piston 170 in a direction 215, which is opposite the direction 210, the control valve 205 is adapted to communicate power fluid from the fluid transport device 130 to the chamber 200 and, at the same time, to communicate power fluid received from the chamber 195 back to the fluid power source 120. In addition, the pressure of the grease within the grease cylinder 180 forces the piston 170 in the direction 215. In some embodiments, the force exerted on the piston 170 by the grease within the grease cylinder 180 is sufficient by itself to stroke the piston 170 in the direction 215. Accordingly, to ensure that the grease cylinder 180 is filled with grease before being stroked in the direction 210, the force exerted on the piston 170 by the grease within the grease cylinder 180 may itself be relied on to stroke the piston 170 in the direction 215. In some embodiments, the fluid power source 120, the fluid transport device 130, the pressure sensor 135, the power cylinder 175, the control valve 205, or any combination thereof, may collectively be referred to herein as an "actuator" (i.e., hydraulic- or pneumatic-powered) for stroking the piston 170 back and forth within the grease cylinder 180. However, in addition, or instead, another "actuator" may also be used to stroke the piston 170 back and forth within the grease cylinder 180 such as, for example, an electric- or gas-powered actuator.

A cycle counter 220 is operably associated with the power cylinder 175. The cycle counter 220 may be or include limit switch(es) or other sensor(s) operably associated with the actuator to give analog or other linear position feedback. In any case, the cycle counter 220 is adapted to count the strokes of the piston 170 within the power cylinder 175. In some embodiments, the cycle counter 220 is capable of detecting partial strokes of the piston 170 to further enable precise greasing of the process valves $105_1$. As a result, if so desired, the system 100 is capable of partially greasing the process valves $105_1$ by allowing an operator to enter the "desired percentage" of grease required. In some embodiments, as in FIG. 3, the control unit 160 is adapted to send control signals to the control valve 205. In addition, the control unit 160 may receive valve position data from the control valve 205. The control unit 160 is also adapted to receive data/readings (e.g., stroke count data) from the cycle counter 220.

A check valve 225 is operably associated with an inlet 226 of the grease cylinder 180 and is adapted to communicate grease from the fluid transport device 145 to the grease cylinder 180 while preventing, or at least reducing, any backflow of the grease through the check valve 225. As a result, when the piston 170 is stroked in the direction 215, the rod portion 190 is retracted at least partially out of the grease cylinder 180 and the check valve 225 permits grease to be drawn into the grease cylinder 180 via the inlet 226. At the same time, a check valve 230 prevents grease from being drawn into the grease cylinder 180 via an outlet 231. The check valve 230 is operably associated with the outlet 231 of the grease cylinder 180 and is adapted to communicate grease from the grease cylinder 180 to the process valves $105_1$ while preventing, or at least reducing, any backflow of the grease through the check valve 230. As a result, when the piston 170 is stroked in the direction 210, the rod portion 190 is extended at least partially into the grease cylinder 180 and the check valve 230 permits grease to be forced out of the grease cylinder 180 via the outlet 231. At the same time, the check valve 225 prevents grease from being forced out of the grease cylinder 180 via the inlet 226. In some embodiments, the check valve 230 is biased to the closed position with more force (e.g., tighter springs) than that of the check valve 225 in order to maintain the pressure of the grease within the grease cylinder 180. For example, springs in the check valve 230 can be tuned to a desired cracking pressure (e.g., about 1000 psi) to determine the pressure of the grease within the grease cylinder 180.

In some embodiments, the grease metering device 165 is "double-acting" and includes a second grease cylinder substantially identical to the grease cylinder 180 and a second rod portion substantially identical to the rod portion 190; the second rod portion extends from the head portion 185 into the second grease cylinder so that, as the head portion 185 travels back and forth in the power cylinder 175, the second rod portion extends at least partially into, and retracts at least partially out of, the second grease cylinder.

Figure 4:
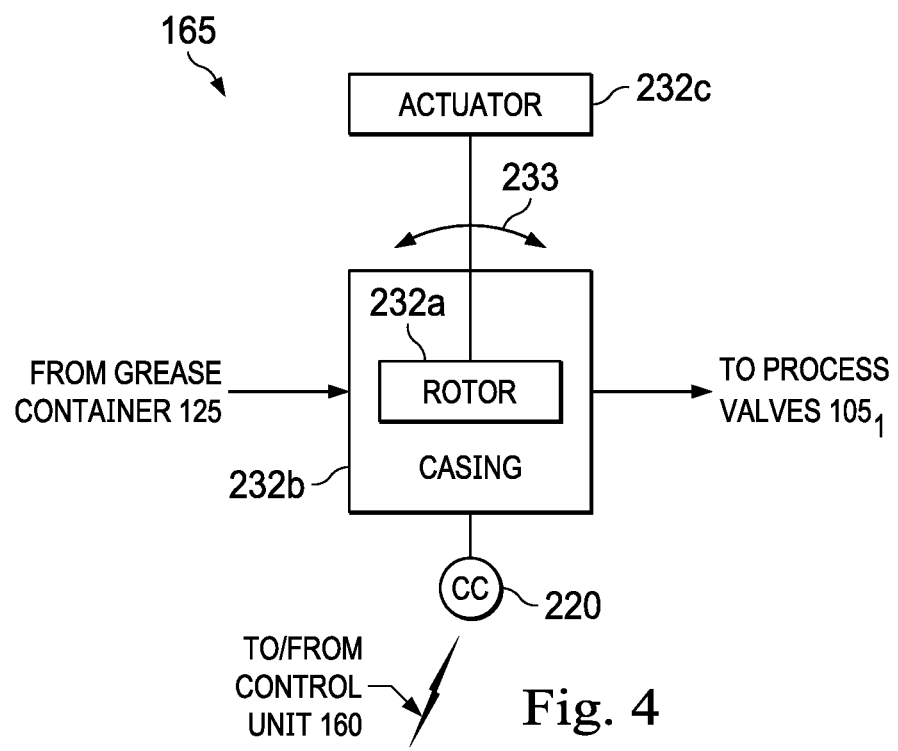
FIG. 4 is a diagrammatic illustration of a second embodiment of at least a portion of one of the metering modules of FIG. 1, according to one or more embodiments of the present disclosure.

Turning to FIG. 4, in an alternative embodiment, the grease metering device 165 is or includes a rotary pump having one or more rotors 232a adapted to be rotated within a casing 232b by an actuator 232c, as indicated by arrow 233 to drive the grease to the process valves $105_1$; in such embodiments, the cycle counter 220 is adapted to count revolutions of the rotor(s) rather than strokes of the piston 170.

Figure 5:
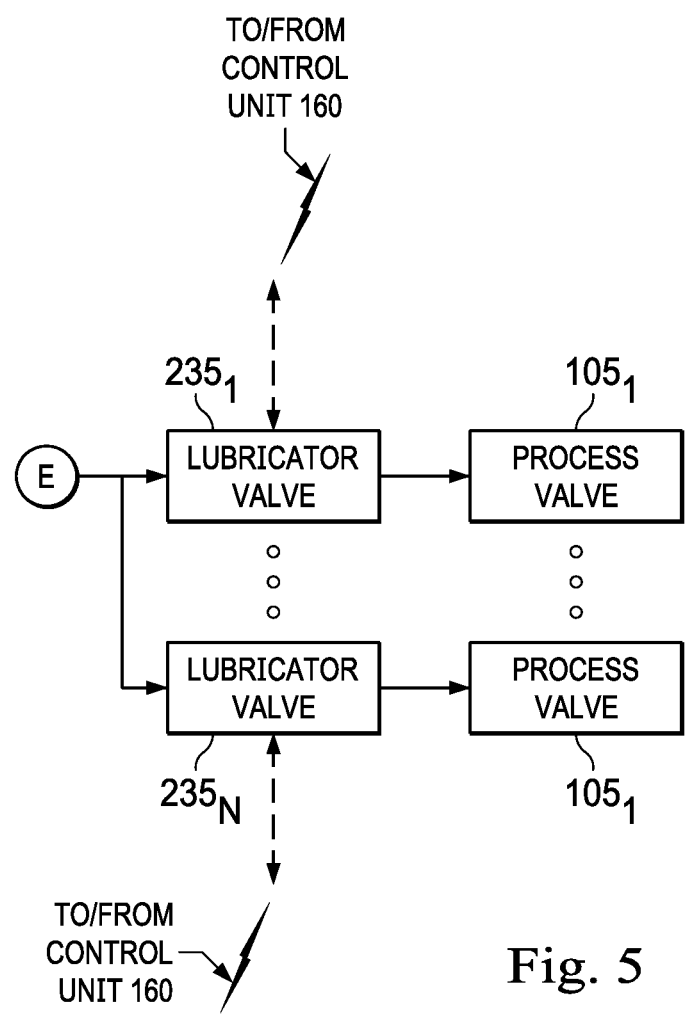
FIG. 5 is a diagrammatic illustration of lubricator valves operably associated with at least some of the process valves of FIG. 1, according to one or more embodiments of the present disclosure.

Referring to FIG. 5 with continuing reference to FIGS. 1-4, in an embodiment, the process valves $105_1$ are adapted to be in communication with the metering module $115_1$ via lubricator valves $235_{1-N}$. In some embodiments, the lubricator valves $235_{1-N}$ are part of the metering module $115_1$. Similarly, the process valves $105_{2-N}$ may be adapted to be in communication with the metering modules $115_{2-N}$, respectively, via lubricator valve(s) substantially identical to the lubricator valves $235_{1-N}$. The lubricator valves $235_{1-N}$ are adapted to selectively communicate grease from the grease cylinder 180 to respective ones of the process valves $105_1$. In some embodiments, as in FIG. 5, the control unit 160 is adapted to send control signals to the lubricator valves $235_{1-N}$. In addition, the control unit 160 may receive valve position data from the lubricator valves $235_{1-N}$.

Alternatively, in some embodiments, the grease metering devices 165 may be omitted and replaced with flow meters that are operably associated with respective ones of the process valves $105_1$ (and thus respective ones of the lubricator valves $235_{1-N}$; in such embodiments, the control unit 160 receives feedback from the flow meters and actuates the lubricator valves $235_{1-N}$ to meter a desired amount of grease to the process valves $105_1$ using the fluid transport device 145. In some embodiments, the system 100 further includes one or more pressure sensors located downstream from the check valve 230 (e.g., to monitor pressure within the process valves $105_1$); as a result, using data/readings obtained from these one or more pressure sensors, the control unit 160 can ensure that the greasing pressure is greater than the pressure within the process valves $105_1$. Additional valves may also be added downstream from the check valve 230 to provide double barriers to prevent, or at least reduce, any leakage of process fluid from the process valve.

Referring collectively to FIGS. 1-5, in operation, the fluid transport device 130 transports power fluid from the fluid power source 120 to the control valve 205 of the metering module $115_1$. During the transporting of the power fluid to the control valve 205, the control unit 160 communicates control signals to the fluid transport device 130 and receives data/readings from the pressure sensor 135. As a result, the control unit 160 can adjust the flow of the power fluid to the control valve 205 using the fluid transport device 130 and monitor the pressure of the power fluid exiting the fluid transport device 130 using the pressure sensor 135. The control valve 205 actuates the piston 170 within the power cylinder 175. To actuate the piston 170 in the direction 210 within the power cylinder 175, the control valve 205 communicates power fluid from the 130 to the chamber 195 and, at the same time, communicates power fluid from the chamber 200 back to the fluid power source 120. Conversely, to actuate the piston 170 in the direction 215 within the power cylinder 175, the control valve 205 communicates power fluid from the fluid transport device 130 to the chamber 200 and, at the same time, communicates power fluid from the chamber 195 back to the fluid power source 120. During the actuation of the piston 170 within the power cylinder 175, the control unit 160 communicates control signals to the control valve 205 and receives data/readings from the cycle counter 220. As a result, the control unit 160 can stroke the piston 170 back and forth within the power cylinder 175 using the control valve 205 and count the strokes of the piston 170 back and forth within the power cylinder 175 using the cycle counter 220. In other embodiments, in addition, or instead, electric or gas power may be utilized to actuate the piston 170.

The fluid transport device 145 transports grease from the grease container 125 to the inlet 226 of the grease cylinder 180. During the transporting of the grease to the grease cylinder 180, the control unit 160 communicates control signals to the fluid transport device 145 and receives data/readings from the pressure sensor 150. As a result, the control unit 160 can adjust the flow of the grease to the grease cylinder 180 using the fluid transport device 145 and monitor the pressure of the grease exiting the fluid transport device 145 using the pressure sensor 150. As the piston 170 is actuated in the direction 215, the grease is drawn into the grease cylinder 180 through the inlet 226. The transporting of the grease to the grease cylinder 180 using the fluid transport device 145 allows the grease to be more efficiently and completely drawn into the grease cylinder 180 through the inlet 226 as the piston 170 is actuated in the direction 215. Conversely, as the piston 170 is actuated in the direction 210, the grease is forced out of the grease cylinder 180 through the outlet 231. The lubricator valves $235_{1-N}$ selectively communicate the grease forced out of the grease cylinder 180 to respective ones of the process valves $105_1$. In addition, the return valve 155 selectively communicates the grease forced out of the grease cylinder 180 back to the grease container 125.

The control unit 160 communicates control signals to the return valve 155 and the lubricator valves $235_{1-N}$. As a result, the control unit 160 can selectively actuate the return valve 155 and the lubricator valves $235_{1-N}$ to determine: whether the grease forced out of the grease cylinder 180 is communicated back to the grease container 125; and/or which of the process valves $105_1$ receives the grease forced out of the grease cylinder 180. For example, if the control unit 160 closes the return valve 155, opens one of the lubricator valves $235_{1-N}$, and closes the remaining lubricator valves $235_{1-N}$, the grease forced out of the grease cylinder 180 will be communicated to the process valve $105_1$ that is operably associated with the opened one of the lubricator valves $235_{1-N}$. For another example, if the control unit 160 opens the return valve 155 and closes the lubricator valves $235_{1-N}$, the grease forced out of the grease cylinder 180 will be communicated back to the grease container 125. Alternatively, the return valve 155 could bypass the grease cylinder 180 by communicating grease back to the grease container 125 before the grease passes through the check valve 225.

The volume of grease forced out of the grease cylinder 180 with each stroke of the piston 170 can be determined via measurement or calculation (e.g., by multiplying the cross-sectional area of the rod portion 190 by the length of the piston 170's stroke); as a result, by controlling and/or monitoring the control valve 205, the cycle counter 220, the lubricator valves $235_{1-N}$, the return valve 155, or any combination thereof, the control unit 160 meters a desired amount of grease to each of the process valves $105_1$. In some embodiments, the desired amount of grease metered to each of the process valves $105_1$ can be specifically tailored according to greasing volume and/or frequency guidelines provided, for example, by the manufacturer(s) of the process valves $105_1$ and stored in a database accessible by the control unit 160. In addition, or instead, the desired amount of grease metered to each of the process valves $105_1$ may be provided by a user via a user interface (HMI) connected to the control unit 160; if so desired, the amount of grease metered to each of the process valves $105_1$ can be changed during a job. In addition, by controlling and/or monitoring the fluid transport devices 130 and 145 and the pressure sensors 135 and 150, the control unit 160 regulates the flow of the power fluid and the grease within the system 100.

In some embodiments, the control unit 160 is further adapted to receive data/readings from a pressure sensor 236 (shown in FIG. 3) that detects the pressure of the grease within the grease cylinder 180; by comparing the data/reading obtained from the pressure sensor 236 with data/readings obtained from the pressure sensor 150, the control unit 160 can determine whether the grease cylinder 180 is filled with grease after the piston 170 is stroked in the direction 215. As a result, the control unit 160 can delay stroking the piston in the direction 210 until the grease cylinder 180 is completely filled with grease, thus improving the accuracy of greasing operations. In some embodiments, the control unit 160 controls the metering modules $115_{2-N}$ to deliver and meter grease to the process valves $105_{2-N}$ in substantially the same manner as that described above with respect to the metering module $115_1$ and the valves $105_1$; therefore, the operation of the metering modules $115_{2-N}$ to deliver and meter grease to the process valves $105_{2-N}$ will not be described in further detail. As a result, the control unit 160 is capable of greasing the process valves $105_{1-N}$ at any of the following intervals: timed intervals; continuous greasing (at a rate specified by the user or the database); greasing on command from an operator via a user interface (HMI) at any time; per operational stage (e.g., fracturing stage); per N stages; schedules greasing; scheduled partial greasing; and/or any combination thereof.

In some embodiments, prior to delivering and metering grease to the process valves $105_{1-N}$, the system 100 is capable of verifying that the process valves $105_{1-N}$ are actuated to the proper position for greasing. To achieve such verification, the system 100 includes sensor(s) associated with the process valves $105_{1-N}$ to ensure they are in the proper position prior to greasing. Such sensor(s) may include, for example, position sensor(s) and/or visual feedback devices (e.g., camera(s), image processing software, etc.) capable of detecting the position of the process valves $105_{1-N}$. In addition, the system 100 may include actuator(s) adapted to receive control signals from the control unit 160 to open or close the process valves $105_{1-N}$. As a result, the control unit 160 is able to automatically place the process valves $105_{1-N}$ in the proper greasing position prior to greasing.

Figure 6:
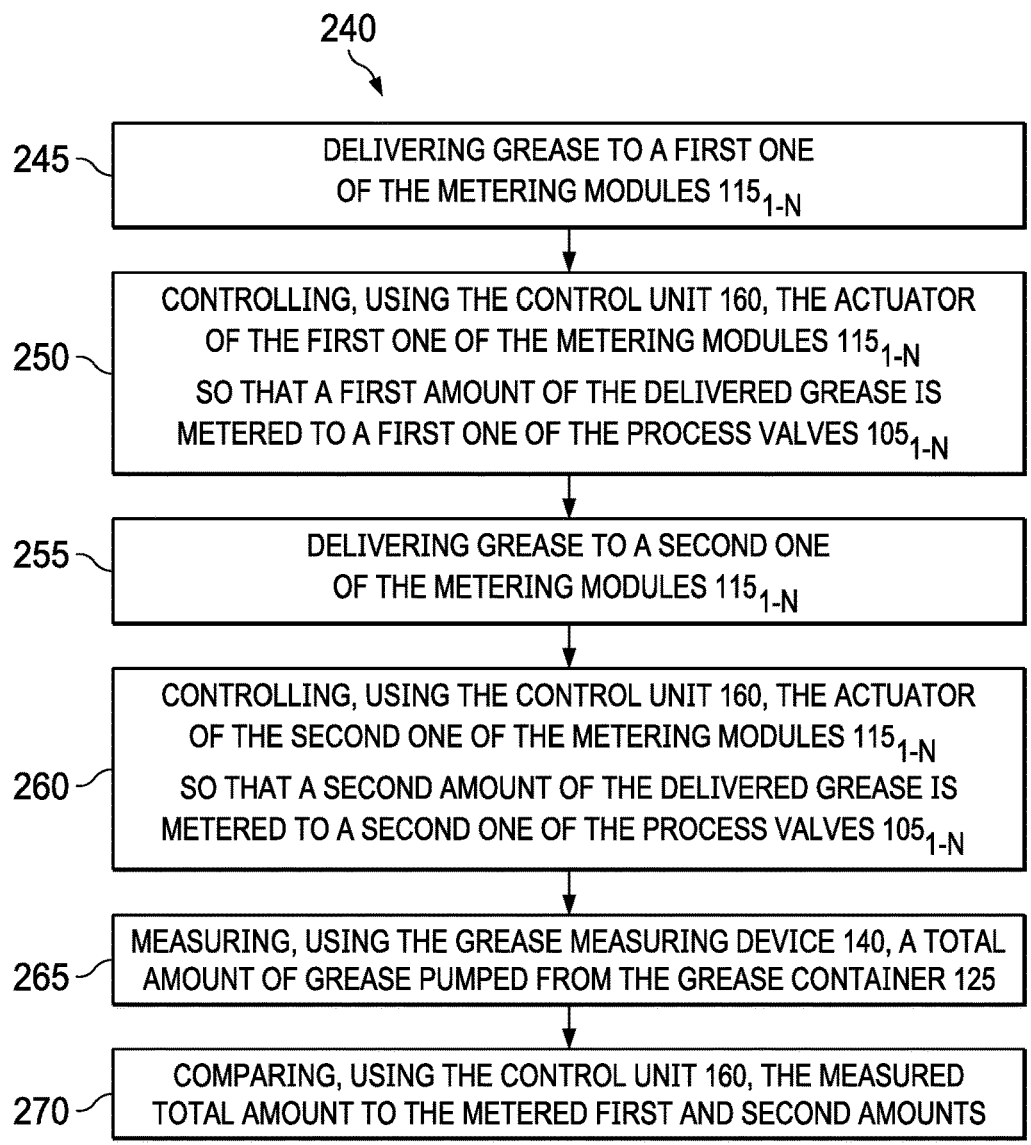
FIG. 6 is a flow diagram of a method for implementing one or more embodiments of the present disclosure.

Referring to FIG. 6, in an embodiment, a method of operating the system 100 is generally referred to by the reference numeral 240. The method 240 is carried out by receiving, at the control unit 160, data/readings from the delivery module 110 (e.g., the pressure sensors 135 and 150) and/or the metering modules $115_{1-N}$ (e.g., the cycle counter 220), and sending, from the control unit 160, control signals to the delivery module 110 (e.g., the fluid transport devices 130 and 145, the return valve 155, or any combination thereof) and/or the metering modules $115_{1-N}$ (e.g., the control valve 205, the lubricator valves $235_{1-N}$, or any combination thereof).

The method 240 includes at a step 245 delivering grease to a first one of the metering modules $115_{1-N}$. In some embodiments, the step 245 includes transporting the grease from the grease container 125 to the first one of the metering modules $115_{1-N}$. At a step 250, the control unit 160 controls the actuator of the first one of the metering modules $115_{1-N}$ so that a first amount of the delivered grease is metered to a first one of the process valves $105_{1-N}$. In some embodiments, the step 250 includes: controlling the actuator of the first one of the metering modules $115_{1-N}$ to start stroking the piston 170; determining how many strokes of the piston 170 are required to meter the first amount to the first one of the process valves $105_{1-N}$; and controlling the actuator to stop stroking the piston 170 when the strokes counted by the cycle counter 220 equal the determined number of strokes required. In other embodiments, the step 250 includes: controlling the actuator 232c of the first one of the metering modules $115_{1-N}$ to start rotating the rotor 232a; determining how many rotations of the rotor 232a are required to meter the first amount to the first one of the process valves $105_{1-N}$; and controlling the actuator to stop rotating the rotor 232a when the rotations by the cycle counter 220 equal the determined number of rotations required. In some embodiments of the step 250, the control unit 160 determines the first amount by retrieving data relating to the first one of the process valves $105_{1-N}$ from a database.

At a step 255, grease is delivered to a second one of the metering modules $115_{1-N}$. In some embodiments, the step 255 includes transporting the grease from the grease container 125 to the second one of the metering modules $115_{1-N}$. At a step 260, the control unit 160 controls the actuator of the second one of the metering modules $115_{1-N}$ so that a second amount of the delivered grease is metered to a second one of the process valves $105_{1-N}$. In some embodiments of the step 260, the control unit 160 determines the second amount by retrieving data relating to the second one of the process valves $105_{1-N}$ from a database. At a step 265, the grease measuring device 140 measures a total amount of grease transported from the grease container 125. Finally, at a step 270, the control unit 160 compares the measured total amount to the metered first and second amounts.

In some embodiments, among other things, the operation of the system 100 and/or the execution of the method 240: ensures that an appropriate amount of grease is injected into each of the process valves $105_{1-N}$ while monitoring the amount of grease injected into each of the process valves $105_{1-N}$; improves the flushing of debris and contaminants from the process valves $105_{1-N}$; improves the performance of the process valves $105_{1-N}$; decreases the risk that a less than adequate amount of grease is injected into the process valves $105_{1-N}$; decreases the risk of malfunction and maintenance needs for the process valves $105_{1-N}$; and/or reduces operators' exposure to oil and gas process units during operation.

Figure 7:
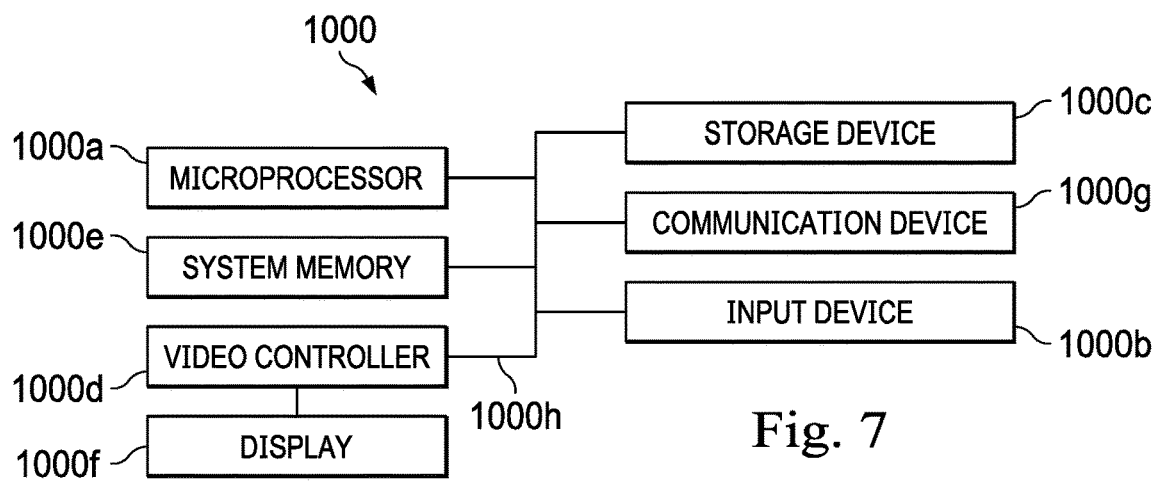
FIG. 7 is a diagrammatic illustration of a computing node for implementing one or more embodiments of the present disclosure.

Referring to FIG. 7, in an embodiment, a computing node 1000 for implementing one or more embodiments of one or more of the above-described elements, control units (e.g., 160), devices (e.g., 140 and/or 165), systems (e.g., 100), methods (e.g., 240) and/or steps (e.g., 245, 250, 255, 260, 265, and/or 270), or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, control units (e.g., 160), devices (e.g., 140 and/or 165), systems (e.g., 100), methods (e.g., 240) and/or steps (e.g., 245, 250, 255, 260, 265, and/or 270), or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

An apparatus has been disclosed. The apparatus generally includes a first grease metering device to which grease is adapted to be delivered, the first grease metering device including either: a first grease cylinder, a first piston extending at least partially within the first grease cylinder, and a first actuator operably associated with the first piston; or a first casing, a first rotor extending at least partially within the first casing, and a second actuator operably associated with the first rotor; and a control unit adapted to either: control the first actuator to stroke the first piston back and forth within the first grease cylinder so that a first amount of the delivered grease is metered to a first process valve; or control the second actuator to rotate the first rotor within the first casing so that the first amount of the delivered grease is metered to the first process valve.

The foregoing apparatus embodiment may include one or more of the following elements/limitations, either alone or in combination with one another:

The control unit is further adapted to determine the first amount by retrieving data relating to the first process valve from a database.

The first grease metering device further includes a first cycle counter adapted to either: count the strokes of the first piston; or count the rotations of the first rotor.

To meter the first amount to the first process valve, the control unit is further adapted to either: control the first actuator to start stroking the first piston, determine how many strokes of the first piston are required to meter the first amount to the first process valve, and control the first actuator to stop stroking the first piston when the strokes counted by the first cycle counter equal the determined number of strokes required; or control the second actuator to start rotating the first rotor, determine how many rotations of the first rotor are required to meter the first amount to the first process valve, and control the second actuator to stop rotating the first rotor when the rotations counted by the first cycle counter equal the determined number of rotations required.

The apparatus further includes: a grease container from which the grease is adapted to be transported to deliver the grease to the first grease metering device; and a grease measuring device adapted to measure a total amount of grease transported from the grease container; wherein the control unit is further adapted to compare the measured total amount to the metered first amount.

The apparatus further includes: a second grease metering device to which grease is adapted to be delivered, the second grease metering device including either: a second grease cylinder, a second piston extending at least partially within the second grease cylinder, and a third actuator operably associated with the second piston; or a second casing, a second rotor extending at least partially within the second casing, and a fourth actuator operably associated with the second rotor; wherein the control unit is further adapted to either: control the third actuator to stroke the second piston back and forth within the second grease cylinder so that a second amount of the delivered grease is metered to a second process valve; or control the fourth actuator to rotate the second rotor within the second casing so that the second amount of the delivered grease is metered to the second process valve.

The control unit is further adapted to determine the first and second amounts by retrieving data relating to the first and second process valves from a database.

The apparatus further includes: a grease container from which the grease is adapted to be transported to deliver the grease to the first and second grease metering devices; and a grease measuring device adapted to measure a total amount of grease transported from the grease container; wherein the control unit is further adapted to compare the measured total amount to the metered first and second amounts.

A method has also been disclosed. The method generally includes delivering grease to a first grease metering device, the first grease metering device including either: a first grease cylinder, a first piston extending at least partially within the first grease cylinder, and a first actuator operably associated with the first piston; or a first casing, a first rotor extending at least partially within the first casing, and a second actuator operably associated with the first rotor; and controlling, using a control unit, either: the first actuator to stroke the first piston back and forth within the first grease cylinder so that a first amount of the delivered grease is metered to a first process valve; or the second actuator to rotate the first rotor within the first casing so that the first amount of the delivered grease is metered to the first process valve.

The foregoing method embodiment may include one or more of the following elements/limitations, either alone or in combination with one another:

The method further includes determining, using the control unit, the first amount by retrieving data relating to the first process valve from a database.

The first grease metering device further includes a first cycle counter; and the method further includes counting, using the first cycle counter, either: the strokes of the first piston; or the rotations of the first rotor.

Controlling, using the control unit, the first actuator includes: controlling the first actuator to start stroking the first piston; determining how many strokes of the first piston are required to meter the first amount to the first process valve; and controlling the first actuator to stop stroking the first piston when the strokes counted by the first cycle counter equal the determined number of strokes required; and controlling, using the control unit, the second actuator includes: controlling the second actuator to start rotating the first rotor; determining how many rotations of the first rotor are required to meter the first amount to the first process valve; and controlling the second actuator to stop rotating the first rotor when the rotations counted by the first cycle counter equal the determined number of rotations required.

Delivering the grease to the first grease metering device includes transporting the grease from a grease container to the first grease metering device; wherein the method further includes: measuring, using a grease measuring device, a total amount of grease transported from the grease container; and comparing, using the control unit, the measured total amount to the metered first amount.

The method further includes delivering grease to a second grease metering device, the second grease metering device including either: a second grease cylinder, a second piston extending at least partially within the second grease cylinder, and a third actuator operably associated with the second piston; or a second casing, a second rotor extending at least partially within the second casing, and a fourth actuator operably associated with the second rotor; and controlling, using the control unit, either: the third actuator to stroke the second piston back and forth within the second grease cylinder so that a second amount of the delivered grease is metered to a second process valve; or the fourth actuator to rotate the second rotor within the second casing so that the second amount of the delivered grease is metered to the second process valve.

The method further includes determining, using the control unit, the first and second amounts by retrieving data relating to the first and second process valves from a database.

Delivering the grease to the first grease metering device includes transporting the grease from a grease container to the first grease metering device; wherein delivering the grease to the second grease metering device includes transporting the grease from the grease container to the second grease metering device; and wherein the method further includes: measuring, using a grease measuring device, a total amount of grease transported from the grease container; and comparing, using the control unit, the measured total amount to the metered first and second amounts.

A system has also been disclosed. The system generally includes a plurality of metering modules adapted to deliver grease to a corresponding plurality of process valves, each of the metering modules including either: a first grease metering device that includes a grease cylinder, a piston extending at least partially within the grease cylinder, and a first actuator operably associated with the piston; or a second grease metering device that includes a casing, a rotor extending at least partially within the casing, and a second actuator operably associated with the rotor; a delivery module including a grease container and a fluid transport device adapted to deliver grease from the grease container to the respective grease metering modules; and a control unit adapted to control: the first actuator(s) to stroke the piston(s) back and forth within the grease cylinder(s) so that respective amounts of the delivered grease are metered to the process valves; and/or the second actuator(s) to rotate the rotor(s) within the casing(s) so that the respective amounts of the delivered grease are metered to the process valves.

The foregoing system embodiment may include one or more of the following elements/limitations, either alone or in combination with one another:

The control unit is further adapted to determine the respective amounts by retrieving data relating to the process valves from a database.

The delivery module further includes a grease measuring device adapted to measure a total amount of grease transported from the grease container; and the control unit is further adapted to compare the measured total amount to the respective metered amounts.

The first grease metering device further includes a first cycle counter adapted to count the strokes of the piston; the second grease metering device further includes a second cycle counter adapted to count the rotations of the rotor; and, to meter the respective amounts to the process valves, the control unit is further adapted to either: control the first actuator(s) to start stroking the piston(s), determine how many strokes are required for the piston(s) to meter the respective amounts to the process valves, and control the first actuator(s) to stop stroking the piston(s) when the strokes counted by the first cycle counter(s) equal the determined number of strokes required; or control the second actuator(s) to start rotating the rotor(s), determine how many rotations are required for the rotor(s) to meter the respective amounts to the process valves, and control the second actuator(s) to stop rotating the rotor(s) when the rotations counted by the second cycle counter(s) equal the determined number of rotations required.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. An apparatus, comprising:
   a first grease metering device to which grease is adapted to be delivered, the first grease metering device comprising:
   a first actuator;
   a first grease cylinder including a first inlet and a first outlet;
   a first check valve adapted to be in fluid communication with a grease container, the first check valve being operably associated with the first inlet and adapted to communicate grease to the first inlet and to prevent, or at least reduce, backflow of grease out of the first grease cylinder through the first check valve;
   a second check valve adapted to be in fluid communication with a first process valve, the second check valve being operably associated with the first outlet and adapted to communicate grease from the first outlet and to prevent, or at least reduce, backflow of grease through the second check valve and into the first grease cylinder; and
   a first piston extending at least partially within the first grease cylinder, the first actuator being operably associated with the first piston;
   a second grease metering device to which grease is adapted to be delivered, the second grease metering device comprising:
   a second actuator;
   a second grease cylinder including a second inlet and a second outlet;
   a third check valve adapted to be in fluid communication with a grease container, the third check valve being operably associated with the second inlet and adapted to communicate grease to the second inlet and to prevent, or at least reduce, backflow of grease out of the second grease cylinder through the third check valve;
   a fourth check valve adapted to be in fluid communication with a second process valve, the fourth check valve being operably associated with the second outlet and adapted to communicate grease from the second outlet and to prevent, or at least reduce, backflow of grease through the fourth check valve and into the second grease cylinder; and
   a second piston extending at least partially within the second grease cylinder, the second actuator being operably associated with the second piston;
   and
   a control unit adapted to:
   control the first actuator to:
   stroke the first piston back and forth within the first grease cylinder so that a first amount of the grease delivered to the first grease metering device, via the first check valve and the first inlet, is metered to the first process valve, via the first outlet and the second check valve, but none of the grease delivered to the first grease metering device is metered to the second process valve;
and
control the second actuator to:
stroke the second piston back and forth within the second grease cylinder so that a second amount of the grease delivered to the second grease metering device, via the third check valve and the second inlet, is metered to the second process valve, via the second outlet and the fourth check valve, but none of the grease delivered to the second grease metering device is metered to the first process valve;
wherein the first actuator comprises:
a first power cylinder within which the first piston at least partially extends, the first piston including a first head portion slidably disposed in the first power cylinder and dividing the first power cylinder into first and second chambers, the first head portion having a first cross-sectional area, the first piston further including another portion adapted to contact the grease in the first grease cylinder and having a second cross-sectional area, the second cross-sectional area being less than the first cross-sectional area; and
a first control valve operably associated with the first power cylinder and adapted to:
stroke the first piston back within the first grease cylinder by communicating power fluid to the first chamber and, at the same time, communicating power fluid from the second chamber; and
stroke the first piston forth within the first grease cylinder by communicating power fluid to the second chamber and, at the same time, communicating power fluid from the first chamber;
wherein the first actuator is:
operably associated with the first piston but not with the second piston;
wherein the second actuator comprises:
a second power cylinder within which the second piston at least partially extends, the second piston including a second head portion slidably disposed in the second power cylinder and dividing the second power cylinder into third and fourth chambers, the second head portion having a third cross-sectional area, the second piston further including another portion adapted to contact the grease in the second grease cylinder and having a fourth cross-sectional area, the fourth cross-sectional area being less than the third cross-sectional area; and
a second control valve operably associated with the second power cylinder and adapted to:
stroke the second piston back within the second grease cylinder by communicating power fluid to the third chamber and, at the same time, communicating power fluid from the fourth chamber; and
stroke the second piston forth within the second grease cylinder by communicating power fluid to the fourth chamber and, at the same time, communicating power fluid from the third chamber;
and
wherein the second actuator is:
operably associated with the second piston but not with the first piston.

2. The apparatus of claim 1, wherein the control unit is further adapted to determine the first and second amounts by retrieving data relating to the first and second process valves from a database.

3. The apparatus of claim 1,
wherein the first grease metering device further comprises a first cycle counter adapted to:
count the strokes of the first piston;
and
wherein the second grease metering device further comprises a second cycle counter adapted to:
count the strokes of the second piston.

4. The apparatus of claim 3,
wherein, to meter the first amount to the first process valve, the control unit is further adapted to:
control the first actuator to start stroking the first piston, determine how many strokes of the first piston are required to meter the first amount to the first process valve, and control the first actuator to stop stroking the first piston when the strokes counted by the first cycle counter equal the determined number of strokes required to meter the first amount;
and
wherein, to meter the second amount to the second process valve, the control unit is further adapted to:
control the second actuator to start stroking the second piston, determine how many strokes of the second piston are required to meter the second amount to the second process valve, and control the second actuator to stop stroking the second piston when the strokes counted by the second cycle counter equal the determined number of strokes required to meter the second amount.

5. The apparatus of claim 1, further comprising the grease container.

6. An apparatus, comprising:
a first grease metering device to which grease is adapted to be delivered, the first grease metering device comprising either:
a first grease cylinder, a first piston extending at least partially within the first grease cylinder, and a first actuator operably associated with the first piston; or
a first casing, a first rotor extending at least partially within the first casing, and a second actuator operably associated with the first rotor;
a control unit adapted to either:
control the first actuator to stroke the first piston back and forth within the first grease cylinder so that a first amount of the delivered grease is metered to a first process valve; or
control the second actuator to rotate the first rotor within the first casing so that the first amount of the delivered grease is metered to the first process valve;
a grease container from which the grease is adapted to be transported to deliver the grease to the first grease metering device; and
a grease measuring device adapted to measure a total amount of grease transported from the grease container;
wherein the control unit is further adapted to compare the measured total amount to the metered first amount.

7. The apparatus of claim 6, wherein the control unit is further adapted to determine the first amount by retrieving data relating to the first process valve from a database.

8. The apparatus of claim 6, wherein the first grease metering device further comprises a first cycle counter adapted to either:

count the strokes of the first piston; or
count the rotations of the first rotor.

9. The apparatus of claim 8, wherein, to meter the first amount to the first process valve, the control unit is further adapted to either:
control the first actuator to start stroking the first piston, determine how many strokes of the first piston are required to meter the first amount to the first process valve, and control the first actuator to stop stroking the first piston when the strokes counted by the first cycle counter equal the determined number of strokes required; or
control the second actuator to start rotating the first rotor, determine how many rotations of the first rotor are required to meter the first amount to the first process valve, and control the second actuator to stop rotating the first rotor when the rotations counted by the first cycle counter equal the determined number of rotations required.

10. An apparatus, comprising:
a first grease metering device to which grease is adapted to be delivered, the first grease metering device comprising either:
a first grease cylinder, a first piston extending at least partially within the first grease cylinder, and a first actuator operably associated with the first piston; or
a first casing, a first rotor extending at least partially within the first casing, and a second actuator operably associated with the first rotor;
a second grease metering device to which grease is adapted to be delivered, the second grease metering device comprising either:
a second grease cylinder, a second piston extending at least partially within the second grease cylinder, and a third actuator operably associated with the second piston; or
a second casing, a second rotor extending at least partially within the second casing, and a fourth actuator operably associated with the second rotor;
a control unit adapted to:
either:
control the first actuator to stroke the first piston back and forth within the first grease cylinder so that a first amount of the delivered grease is metered to a first process valve; or
control the second actuator to rotate the first rotor within the first casing so that the first amount of the delivered grease is metered to the first process valve;
and
either:
control the third actuator to stroke the second piston back and forth within the second grease cylinder so that a second amount of the delivered grease is metered to a second process valve; or
control the fourth actuator to rotate the second rotor within the second casing so that the second amount of the delivered grease is metered to the second process valve;
a grease container from which the grease is adapted to be transported to deliver the grease to the first and second grease metering devices; and
a grease measuring device adapted to measure a total amount of grease transported from the grease container;
wherein the control unit is further adapted to compare the measured total amount to the metered first and second amounts.

11. The apparatus of claim 10, wherein the control unit is further adapted to determine the first and second amounts by retrieving data relating to the first and second process valves from a database.

12. The apparatus of claim 10,
wherein the first grease metering device further comprises a first cycle counter adapted to either:
count the strokes of the first piston; or
count the rotations of the first rotor;
and
wherein the second grease metering device further comprises a second cycle counter adapted to either:
count the strokes of the second piston; or
count the rotations of the second rotor.

13. The apparatus of claim 12,
wherein, to meter the first amount to the first process valve, the control unit is further adapted to either:
control the first actuator to start stroking the first piston, determine how many strokes of the first piston are required to meter the first amount to the first process valve, and control the first actuator to stop stroking the first piston when the strokes counted by the first cycle counter equal the determined number of strokes required to meter the first amount; or
control the second actuator to start rotating the first rotor, determine how many rotations of the first rotor are required to meter the first amount to the first process valve, and control the second actuator to stop rotating the first rotor when the rotations counted by the first cycle counter equal the determined number of rotations required to meter the first amount;
and
wherein, to meter the second amount to the second process valve, the control unit is further adapted to either:
control the third actuator to start stroking the second piston, determine how many strokes of the second piston are required to meter the second amount to the second process valve, and control the third actuator to stop stroking the second piston when the strokes counted by the second cycle counter equal the determined number of strokes required to meter the second amount; or
control the fourth actuator to start rotating the second rotor, determine how many rotations of the second rotor are required to meter the second amount to the second process valve, and control the fourth actuator to stop rotating the second rotor when the rotations counted by the second cycle counter equal the determined number of rotations required to meter the second amount.

14. A method, comprising:
delivering grease to a first grease metering device, the first grease metering device comprising:
a first actuator;
a first grease cylinder including a first inlet and a first outlet;
a first check valve adapted to be in fluid communication with a grease container, the first check valve being operably associated with the first inlet;
a second check valve adapted to be in fluid communication with a first process valve, the second check valve being operably associated with the first outlet and adapted to communicate grease from the first outlet and to prevent, or at least reduce, backflow of grease through the second check valve and into the first grease cylinder; and a first piston extending at least partially within the first grease cylinder, the first actuator being operably associated with the first piston;

wherein delivering grease to the first grease metering device comprises communicating grease to the first inlet via the first check valve and preventing, or at least reducing, backflow of grease out of the first grease cylinder through the first check valve;

delivering grease to a second grease metering device, the second grease metering device comprising:
  a second actuator;
  a second grease cylinder;
  a third check valve adapted to be in fluid communication with the grease container, the third check valve being operably associated with the second inlet;
  a fourth check valve adapted to be in fluid communication with a second process valve, the fourth check valve being operably associated with the second outlet and adapted to communicate grease from the second outlet and to prevent, or at least reduce, backflow of grease through the fourth check valve and into the second grease cylinder; and
  a second piston extending at least partially within the second grease cylinder, the second actuator being operably associated with the second piston;
  wherein delivering grease to the second grease metering device comprises communicating grease to the second inlet via the third check valve and preventing, or at least reducing, backflow of grease out of the second grease cylinder through the third check valve;

and
controlling, using a control unit:
  the first actuator to:
    stroke the first piston back and forth within the first grease cylinder so that a first amount of the grease delivered to the first grease metering device, via the first check valve and the first inlet, is metered to a first process valve, via the first outlet and the second check valve, but none of the grease delivered to the first grease metering device is metered to a second process valve;
  and
  the second actuator to:
    stroke the second piston back and forth within the second grease cylinder so that a second amount of the grease delivered to the second grease metering device, via the third check valve and the second inlet, is metered to the second process valve, via the second outlet and the fourth check valve, but none of the grease delivered to the second grease metering device is metered to the first process valve;

wherein the first actuator comprises:
  a first power cylinder within which the first piston at least partially extends, the first piston including a first head portion slidably disposed in the first power cylinder and dividing the first power cylinder into first and second chambers, the first head portion having a first cross-sectional area, the first piston further including another portion adapted to contact the grease in the first grease cylinder and having a second cross-sectional area, the second cross-sectional area being less than the first cross-sectional area; and
  a first control valve operably associated with the first power cylinder;

wherein controlling, using the control unit, the first actuator to stroke the first piston back and forth within the first grease cylinder comprises:
  communicating power fluid to the first chamber and, at the same time, communicating power fluid from the second chamber to stroke the first piston back within the first grease cylinder;
  communicating power fluid to the second chamber and, at the same time, communicating power fluid from the first chamber to stroke the first piston forth within the first grease cylinder;

wherein the first actuator is:
  operably associated with the first piston but not with the second piston;

wherein the second actuator comprises:
  a second power cylinder within which the second piston at least partially extends, the second piston including a second head portion slidably disposed in the second power cylinder and dividing the second power cylinder into third and fourth chambers, the second head portion having a third cross-sectional area, the second piston further including another portion adapted to contact the grease in the second grease cylinder and having a fourth cross-sectional area, the fourth cross-sectional area being less than the third cross-sectional area; and
  a second control valve operably associated with the second power cylinder;

wherein controlling, using the control unit, the second actuator to stroke the second piston back and forth within the second grease cylinder comprises:
  communicating power fluid to the third chamber and, at the same time, communicating power fluid from the fourth chamber to stroke the second piston back within the second grease cylinder; and
  communicating power fluid to the fourth chamber and, at the same time, communicating power fluid from the third chamber to stroke the second piston forth within the second grease cylinder;

and
wherein the second actuator is:
  operably associated with the second piston but not with the first piston.

15. The method of claim 14, further comprising:
determining, using the control unit, the first and second amounts by retrieving data relating to the first and second process valves from a database.

16. The method of claim 14, wherein the first grease metering device further comprises a first cycle counter;
wherein the method further comprises counting, using the first cycle counter, the strokes of the first piston;
wherein the second grease metering device further comprises a second cycle counter; and
wherein the method further comprises counting, using the second cycle counter, the strokes of the second piston.

17. The method of claim 16,
wherein controlling, using the control unit, the first actuator comprises:
  controlling the first actuator to start stroking the first piston;
  determining how many strokes of the first piston are required to meter the first amount to the first process valve; and
  controlling the first actuator to stop stroking the first piston when the strokes counted by the first cycle counter equal the determined number of strokes required to meter the first amount;

and
wherein controlling, using the control unit, the second actuator comprises:
controlling the second actuator to start stroking the second piston;
determining how many strokes of the second piston are required to meter the second amount to the second process valve; and
controlling the second actuator to stop stroking the second piston when the strokes counted by the second cycle counter equal the determined number of strokes required to meter the second amount.

18. The method of claim 14, further comprising:
transporting grease from the grease container.

19. A method, comprising:
delivering grease to a first grease metering device, the first grease metering device comprising either:
a first grease cylinder, a first piston extending at least partially within the first grease cylinder, and a first actuator operably associated with the first piston; or
a first casing, a first rotor extending at least partially within the first casing, and a second actuator operably associated with the first rotor;
and
controlling, using a control unit, either:
the first actuator to stroke the first piston back and forth within the first grease cylinder so that a first amount of the delivered grease is metered to a first process valve; or
the second actuator to rotate the first rotor within the first casing so that the first amount of the delivered grease is metered to the first process valve;
wherein delivering the grease to the first grease metering device comprises transporting the grease from a grease container to the first grease metering device; and
wherein the method further comprises:
measuring, using a grease measuring device, a total amount of grease transported from the grease container; and
comparing, using the control unit, the measured total amount to the metered first amount.

20. The method of claim 19, further comprising:
determining, using the control unit, the first amount by retrieving data relating to the first process valve from a database.

21. The method of claim 19, wherein the first grease metering device further comprises a first cycle counter; and
wherein the method further comprises counting, using the first cycle counter, either: the strokes of the first piston; or the rotations of the first rotor.

22. The method of claim 21,
wherein controlling, using the control unit, the first actuator comprises:
controlling the first actuator to start stroking the first piston;
determining how many strokes of the first piston are required to meter the first amount to the first process valve; and
controlling the first actuator to stop stroking the first piston when the strokes counted by the first cycle counter equal the determined number of strokes required;
and
wherein controlling, using the control unit, the second actuator comprises:
controlling the second actuator to start rotating the first rotor;
determining how many rotations of the first rotor are required to meter the first amount to the first process valve; and
controlling the second actuator to stop rotating the first rotor when the rotations counted by the first cycle counter equal the determined number of rotations required.

23. A method, comprising:
delivering grease to a first grease metering device, the first grease metering device comprising either:
a first grease cylinder, a first piston extending at least partially within the first grease cylinder, and a first actuator operably associated with the first piston; or
a first casing, a first rotor extending at least partially within the first casing, and a second actuator operably associated with the first rotor;
delivering grease to a second grease metering device, the second grease metering device comprising either:
a second grease cylinder, a second piston extending at least partially within the second grease cylinder, and a third actuator operably associated with the second piston; or
a second casing, a second rotor extending at least partially within the second casing, and a fourth actuator operably associated with the second rotor;
and
controlling, using a control unit:
either:
the first actuator to stroke the first piston back and forth within the first grease cylinder so that a first amount of the delivered grease is metered to a first process valve; or
the second actuator to rotate the first rotor within the first casing so that the first amount of the delivered grease is metered to the first process valve;
and
either:
the third actuator to stroke the second piston back and forth within the second grease cylinder so that a second amount of the delivered grease is metered to a second process valve; or
the fourth actuator to rotate the second rotor within the second casing so that the second amount of the delivered grease is metered to the second process valve;
wherein delivering the grease to the first grease metering device comprises transporting the grease from a grease container to the first grease metering device;
wherein delivering the grease to the second grease metering device comprises transporting the grease from the grease container to the second grease metering device; and
wherein the method further comprises:
measuring, using a grease measuring device, a total amount of grease transported from the grease container; and
comparing, using the control unit, the measured total amount to the metered first and second amounts.

24. The method of claim 23, further comprising:
determining, using the control unit, the first and second amounts by retrieving data relating to the first and second process valves from a database.

25. The method of claim 23, wherein the first grease metering device further comprises a first cycle counter;
wherein the method further comprises counting, using the first cycle counter, either: the strokes of the first piston; or the rotations of the first rotor;

wherein the second grease metering device further comprises a second cycle counter; and
wherein the method further comprises counting, using the second cycle counter, either: the strokes of the second piston; or the rotations of the second rotor.

26. The method of claim 25,
wherein controlling, using the control unit, the first actuator comprises:
   controlling the first actuator to start stroking the first piston;
   determining how many strokes of the first piston are required to meter the first amount to the first process valve; and
   controlling the first actuator to stop stroking the first piston when the strokes counted by the first cycle counter equal the determined number of strokes required to meter the first amount;
wherein controlling, using the control unit, the second actuator comprises:
   controlling the second actuator to start rotating the first rotor;
   determining how many rotations of the first rotor are required to meter the first amount to the first process valve; and
   controlling the second actuator to stop rotating the first rotor when the rotations counted by the first cycle counter equal the determined number of rotations required to meter the first amount;
wherein controlling, using the control unit, the third actuator comprises:
   controlling the third actuator to start stroking the second piston;
   determining how many strokes of the second piston are required to meter the second amount to the second process valve; and
   controlling the third actuator to stop stroking the second piston when the strokes counted by the second cycle counter equal the determined number of strokes required to meter the second amount;
and
wherein controlling, using the control unit, the fourth actuator comprises:
   controlling the fourth actuator to start rotating the second rotor;
   determining how many rotations of the second rotor are required to meter the second amount to the second process valve; and
   controlling the fourth actuator to stop rotating the second rotor when the rotations counted by the second cycle counter equal the determined number of rotations required to meter the second amount.

27. A system, comprising:
a plurality of metering modules adapted to deliver grease to a corresponding plurality of process valves, each of the metering modules comprising
   a grease metering device that includes:
      a grease cylinder including an inlet and an outlet,
      a first check valve adapted to be in fluid communication with a grease container, the first check valve being operably associated with the inlet and adapted to communicate grease to the inlet and to prevent, or at least reduce, backflow of grease out of the grease cylinder through the first check valve,
      a second check valve adapted to be in fluid communication with one or more of the process valves, the second check valve being operably associated with the outlet and adapted to communicate grease from the outlet and to prevent, or at least reduce, backflow of grease through the second check valve and into the grease cylinder,
      a piston extending at least partially within the grease cylinder, and
      an actuator operably associated with the piston;
   a delivery module comprising the grease container and a fluid transport device adapted to deliver grease from the grease container to respective ones of the grease metering modules via respective ones of the first check valves and respective ones of the inlets; and
   a control unit adapted to control:
      the actuators to stroke the pistons back and forth within the grease cylinders so that respective amounts of the grease delivered to respective ones of the grease metering devices are metered to respective ones of the process valves, via respective ones of the outlets and respective ones of the second check valves, but none of the grease delivered to the respective ones of the grease metering devices is metered to others of the process valves;
wherein the plurality of metering modules comprises a first metering module and a second metering module;
wherein the actuator of the first metering module comprises:
   a first power cylinder within which the piston of the first metering module at least partially extends, the piston of the first metering module including a first head portion slidably disposed in the first power cylinder and dividing the first power cylinder into first and second chambers, the first head portion having a first cross-sectional area, the first piston further including another portion adapted to contact the grease in the first grease cylinder and having a second cross-sectional area, the second cross-sectional area being less than the first cross-sectional area; and
   a first control valve operably associated with the first power cylinder and adapted to:
      stroke the piston of the first metering module back within the grease cylinder of the first metering module by communicating power fluid to the first chamber and, at the same time, communicating power fluid from the second chamber; and
      stroke the piston of the first metering module forth within the grease cylinder of the first metering module by communicating power fluid to the second chamber and, at the same time, communicating power fluid from the first chamber;
wherein the second actuator of the first metering module is:
   operably associated with the piston of the first metering module but not with the piston of the second metering module;
wherein the actuator of the second metering module comprises:
   a second power cylinder within which the piston of the second metering module at least partially extends, the piston of the second metering module including a second head portion slidably disposed in the second power cylinder and dividing the second power cylinder into third and fourth chambers, the second head portion having a third cross-sectional area, the second piston further including another portion adapted to contact the grease in the second grease cylinder and having a fourth cross-sectional area, the fourth cross-sectional area being less than the third cross-sectional area; and a second control valve operably associated with the second power cylinder and adapted to:

stroke the piston of the second metering module back within the grease cylinder of the second metering module by communicating power fluid to the third chamber and, at the same time, communicating power fluid from the fourth chamber; and stroke the piston of the second metering module forth within the grease cylinder of the second metering module by communicating power fluid to the through chamber and, at the same time, communicating power fluid from the third chamber;

and wherein the actuator of the second metering module is:

operably associated with the piston of the second metering module but not with the piston of the first metering module.

28. The system of claim 27, wherein the control unit is further adapted to determine the respective amounts by retrieving data relating to the process valves from a database.

29. The system of claim 27, wherein the grease metering devices each further include a cycle counter adapted to count the strokes of the piston;

and wherein, to meter the respective amounts to the process valves, the control unit is further adapted to:

control the actuators to start stroking the pistons, determine how many strokes are required for pistons to meter the respective amounts to the process valves, and control the actuators to stop stroking the pistons when the strokes counted by the cycle counters equal the determined number of strokes required.

30. A system, comprising:

a plurality of metering modules adapted to deliver grease to a corresponding plurality of process valves, each of the metering modules comprising either:

a first grease metering device that includes a grease cylinder, a piston extending at least partially within the grease cylinder, and a first actuator operably associated with the piston; or a second grease metering device that includes a casing, a rotor extending at least partially within the casing, and a second actuator operably associated with the rotor;

a delivery module comprising a grease container and a fluid transport device adapted to deliver grease from the grease container to the respective grease metering modules; and a control unit adapted to control:

the first actuator(s) to stroke the piston(s) back and forth within the grease cylinder(s) so that respective amounts of the delivered grease are metered to the process valves; and/or the second actuator(s) to rotate the rotor(s) within the casing(s) so that the respective amounts of the delivered grease are metered to the process valves;

wherein the delivery module further comprises a grease measuring device adapted to measure a total amount of grease transported from the grease container; and wherein the control unit is further adapted to compare the measured total amount to the respective metered amounts.

31. The system of claim 30, wherein the control unit is further adapted to determine the respective amounts by retrieving data relating to the process valves from a database.

32. The system of claim 30, wherein:

the first grease metering device(s) each further include a first cycle counter adapted to count the strokes of the piston; and/or the second grease metering device(s) each further include a second cycle counter adapted to count the rotations of the rotor;

and wherein, to meter the respective amounts to the process valves, the control unit is further adapted to:

control the first actuator(s) to start stroking the piston(s), determine how many strokes are required for the piston(s) to meter the respective amounts to the process valves, and control the first actuator(s) to stop stroking the piston(s) when the strokes counted by the first cycle counter(s) equal the determined number of strokes required; and/or control the second actuator(s) to start rotating the rotor(s), determine how many rotations are required for the rotor(s) to meter the respective amounts to the process valves, and control the second actuator(s) to stop rotating the rotor(s) when the rotations counted by the second cycle counter(s) equal the determined number of rotations required.

33. An apparatus, comprising:

a first grease metering device to which grease is adapted to be delivered, the first grease metering device comprising:

a first actuator;

a first grease cylinder including a first inlet and a first outlet;

a first check valve adapted to be in fluid communication with a grease container, the first check valve being operably associated with the first inlet and adapted to communicate grease to the first inlet and to prevent, or at least reduce, backflow of grease out of the first grease cylinder through the first check valve;

a second check valve adapted to be in fluid communication with a first process valve, the second check valve being operably associated with the first outlet and adapted to communicate grease from the first outlet and to prevent, or at least reduce, backflow of grease through the second check valve and into the first grease container; and a first piston extending at least partially within the first grease cylinder, the first actuator being operably associated with the first piston;

and a second grease metering device to which grease is adapted to be delivered, the second grease metering device comprising:

a second actuator;

a second grease cylinder including a second inlet and a second outlet;

a third check valve adapted to be in fluid communication with the grease container, the third check valve being operably associated with the second inlet and adapted to communicate grease to the second inlet and to prevent, or at least reduce, backflow of grease out of the second grease cylinder through the third check valve;
a fourth check valve adapted to be in fluid communication with a second process valve, the fourth check valve being operably associated with the second outlet and adapted to communicate grease from the second outlet and the prevent, or at least reduce, backflow of grease through the fourth check valve and into the second grease cylinder; and
a second piston extending at least partially within the second grease cylinder, the second actuator being operably associated with the second piston;

wherein the first actuator is:
operably associated with the first piston but not with the second piston;

wherein the first actuator is actuable to:
stroke the first piston back and forth within the first grease cylinder so that a first amount of the grease delivered to the first grease metering device, via the first check valve and the first inlet, is metered to the first process valve, via the first outlet and the second check valve, but none of the grease delivered to the first grease metering device is metered to the second process valve;

wherein the first actuator comprises:
a first power cylinder within which the first piston at least partially extends, the first piston including a first head portion slidably disposed in the first power cylinder and dividing the first power cylinder into first and second chambers, the first head portion having a first cross-sectional area, the first piston further including another portion adapted to contact the grease in the first grease cylinder and having a second cross-sectional area, the second cross-sectional area being less than the first cross-sectional area; and
a first control valve operably associated with the first power cylinder and adapted to:
stroke the first piston back within the first grease cylinder by communicating power fluid to the first chamber and, at the same time, communicating power fluid from the second chamber; and
stroke the first piston forth within the first grease cylinder by communicating power fluid to the second chamber and, at the same time, communicating power fluid from the first chamber;

wherein the second actuator is:
operably associated with the second piston but not with the first piston;

wherein the second actuator is actuable to:
stroke the second piston back and forth within the second grease cylinder so that a second amount of the grease delivered to the second grease metering device, via the third check valve and the second inlet, is metered to the second process valve, via the second outlet and the fourth check valve, but none of the grease delivered to the second grease metering device is metered to the first process valve;
and
wherein the second actuator comprises:
a second power cylinder within which the second piston at least partially extends, the second piston including a second head portion slidably disposed in the second power cylinder and dividing the second power cylinder into third and fourth chambers, the second head portion having a third cross-sectional area, the second piston further including another portion adapted to contact the grease in the second grease cylinder and having a fourth cross-sectional area, the fourth cross-sectional area being less than the third cross-sectional area; and
a second control valve operably associated with the second power cylinder and adapted to:
stroke the second piston back within the second grease cylinder by communicating power fluid to the third chamber and, at the same time, communicating power fluid from the fourth chamber; and
stroke the second piston forth within the second grease cylinder by communicating power fluid to the fourth chamber and, at the same time, communicating power fluid from the third chamber.

34. The apparatus of claim 33,
wherein the first grease metering device further comprises a first cycle counter adapted to:
count the strokes of the first piston;
and
wherein the second grease metering device further comprises a second cycle counter adapted to:
count the strokes of the second piston.

35. The apparatus of claim 34,
wherein, to meter the first amount to the first process valve, the first actuator is actuable to:
start stroking the first piston and stop stroking the first piston when the strokes counted by the first cycle counter equal a first number of strokes required to meter the first amount;
and
wherein, to meter the second amount to the second process valve, the second actuator is actuable to:
start stroking the second piston and stop stroking the second piston when the strokes counted by the second cycle counter equal a second number of strokes required to meter the second amount.

36. The apparatus of claim 33, further comprising:
the grease container from which the grease is adapted to be transported to deliver the grease to the first and second grease metering devices; and
a grease measuring device adapted to measure a total amount of grease transported from the grease container.

37. An apparatus, comprising:
a first grease metering device to which grease is adapted to be delivered, the first grease metering device comprising:
a first actuator;
a first grease cylinder including a first inlet and a first outlet;
a first check valve adapted to be in fluid communication with a grease container, the first check valve being operably associated with the first inlet and adapted to communicate grease to the first inlet and to prevent, or at least reduce, backflow of grease out of the first grease cylinder through the first check valve;
a second check valve adapted to be in fluid communication with a first process valve, the second check valve being operably associated with the first outlet and adapted to communicate grease from the first outlet and to prevent, or at least reduce, backflow of grease through the second check valve and into the first grease container; and
a first piston extending at least partially within the first grease cylinder, the first actuator being operably associated with the first piston;

and
a second grease metering device to which grease is adapted to be delivered, the second grease metering device comprising:
  a second actuator;
  a second grease cylinder including a second inlet and a second outlet;
  a third check valve adapted to be in fluid communication with the grease container, the third check valve being operably associated with the second inlet and adapted to communicate grease to the second inlet and to prevent, or at least reduce, backflow of grease out of the second grease cylinder through the third check valve;
  a fourth check valve adapted to be in fluid communication with a second process valve, the fourth check valve being operably associated with the second outlet and adapted to communicate grease from the second outlet and the prevent, or at least reduce, backflow of grease through the fourth check valve and into the second grease cylinder; and
  a second piston extending at least partially within the second grease cylinder, the second actuator being operably associated with the second piston;
wherein the first actuator is actuable to:
  stroke the first piston back and forth within the first grease cylinder so that a first amount of the grease delivered to the first grease metering device, via the first check valve and the first inlet, is metered to the first process valve, via the first outlet and the second check valve, but none of the grease delivered to the first grease metering device is delivered to the second process valve;
wherein the first actuator comprises:
  a first power cylinder within which the first piston at least partially extends, the first piston including a first head portion slidably disposed in the first power cylinder and dividing the first power cylinder into first and second chambers, the first head portion having a first cross-sectional area, the first piston further including another portion adapted to contact the grease in the first grease cylinder and having a second cross-sectional area, the second cross-sectional area being less than the first cross-sectional area; and
  a first control valve operably associated with the first power cylinder and adapted to:
    stroke the first piston back within the first grease cylinder by communicating power fluid to the first chamber and, at the same time, communicating power fluid from the second chamber; and
    stroke the first piston forth within the first grease cylinder by communicating power fluid to the second chamber and, at the same time, communicating power fluid from the first chamber;

wherein the first grease metering device further comprises a first cycle counter adapted to:
  count the strokes of the first piston;
wherein the second actuator is actuable to:
  stroke the second piston back and forth within the second grease cylinder so that a second amount of the delivered grease delivered to the second grease metering device, via the third check valve and the second inlet, is metered to the second process valve, via the second outlet and the fourth check valve, but none of the grease delivered to the second grease metering device is delivered to the first process valve;
wherein the second actuator comprises:
  a second power cylinder within which the second piston at least partially extends, the second piston including a second head portion slidably disposed in the second power cylinder and dividing the second power cylinder into third and fourth chambers, the second head portion having a third cross-sectional area, the second piston further including another portion adapted to contact the grease in the second grease cylinder and having a fourth cross-sectional area, the fourth cross-sectional area being less than the third cross-sectional area; and
  a second control valve operably associated with the second power cylinder and adapted to:
    stroke the second piston back within the second grease cylinder by communicating power fluid to the third chamber and, at the same time, communicating power fluid from the fourth chamber; and
    stroke the second piston forth within the second grease cylinder by communicating power fluid to the fourth chamber and, at the same time, communicating power fluid from the third chamber;
and
wherein the second grease metering device further comprises a second cycle counter adapted to:
  count the strokes of the second piston.

38. The apparatus of claim 37,
wherein, to meter the first amount to the first process valve, the first actuator is actuable to:
  start stroking the first piston and stop stroking the first piston when the strokes counted by the first cycle counter equal a first number of strokes required to meter the first amount;
and
wherein, to meter the second amount to the second process valve, the second actuator is actuable to:
  start stroking the second piston and stop stroking the second piston when the strokes counted by the second cycle counter equal a second number of strokes required to meter the second amount.

39. The apparatus of claim 37, further comprising:
the grease container from which the grease is adapted to be transported to deliver the grease to the first and second grease metering devices; and
a grease measuring device adapted to measure a total amount of grease transported from the grease container.

* * * * *

UNITED STATES PATENT AND TRADEMARK OFFICE
CERTIFICATE OF CORRECTION

PATENT NO. : 10,724,682 B2  
APPLICATION NO. : 16/248648  
DATED : July 28, 2020  
INVENTOR(S) : Ronnie B. Beason and Nicholas J. Cannon Page 1 of 1

It is certified that error appears in the above-identified patent and that said Letters Patent is hereby corrected as shown below:

In the Claims

Column 24, Line 52, Claim 27 delete "second"

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*